United States Patent
Jones et al.

[19]

[11] Patent Number: 5,992,818
[45] Date of Patent: Nov. 30, 1999

[54] CONTROL VALVE AND METHOD OF MAKING AND INSTALLING

[75] Inventors: Gary Lee Jones, Sharon Center; Dale Everett Fagaly, Fairfield, both of Ohio

[73] Assignees: Fred J. Martin; Edward W. Rausch, both of Hinckley, Ohio

[21] Appl. No.: 08/228,573

[22] Filed: Apr. 15, 1994

[51] Int. Cl.⁶ ........................................................ F16K 7/04
[52] U.S. Cl. ................................. 251/7; 251/4; 251/358
[58] Field of Search ................................. 251/4, 7, 8, 358

[56] References Cited

U.S. PATENT DOCUMENTS

| | | | |
|---|---|---|---|
| 3,268,201 | 8/1966 | Little | 251/8 |
| 3,695,576 | 10/1972 | Kane et al. | 251/5 |
| 3,724,807 | 4/1973 | Jackson | 251/7 |
| 3,771,758 | 11/1973 | Little | 251/4 |
| 3,823,724 | 7/1974 | Davis | 137/15 |
| 3,965,925 | 6/1976 | Gooch | 137/451 |
| 4,044,990 | 8/1977 | Summerfield | 251/8 |
| 4,108,418 | 8/1978 | Ensign et al. | 251/5 |
| 4,125,125 | 11/1978 | Ezekoye et al. | 137/315 |
| 4,132,382 | 1/1979 | Jackson | 251/5 |
| 4,135,550 | 1/1979 | Andersson | 137/565 |
| 4,172,580 | 10/1979 | Raftis et al. | 251/8 |
| 4,195,810 | 4/1980 | Lavin | 251/5 |
| 4,268,005 | 5/1981 | Raftis et al. | 251/5 |
| 4,303,222 | 12/1981 | Campbell | 251/7 |
| 4,322,054 | 3/1982 | Campbell | 251/5 |
| 4,372,528 | 2/1983 | Raftis | 251/4 |
| 4,492,253 | 1/1985 | Raftis | 137/849 |
| 4,523,738 | 6/1985 | Raftis et al. | 251/4 |
| 4,534,224 | 8/1985 | Raftis | 73/730 |
| 4,585,031 | 4/1986 | Raftis et al. | 137/846 |
| 4,603,864 | 8/1986 | Raftis | 277/12 |
| 4,607,663 | 8/1986 | Raftis et al. | 137/846 |
| 4,630,635 | 12/1986 | Bernstein et al. | 137/315 |
| 4,682,755 | 7/1987 | Bernstein et al. | 251/4 |
| 4,763,527 | 8/1988 | Raftis | 73/730 |
| 4,800,920 | 1/1989 | Yusko, Jr. et al. | 137/556 |
| 4,877,053 | 10/1989 | Yusko, Jr. et al. | 137/556 |
| 4,895,341 | 1/1990 | Brown et al. | 251/8 |
| 4,899,783 | 2/1990 | Yusko, Jr. et al. | 137/556 |
| 4,921,206 | 5/1990 | Dunstan et al. | 251/7 |
| 4,923,166 | 5/1990 | Raftis | 251/4 |
| 5,007,803 | 4/1991 | DiVito et al. | 417/137 |

FOREIGN PATENT DOCUMENTS

| | | | |
|---|---|---|---|
| 694156 | 9/1964 | Canada | 251/8 |
| 1569827 | 6/1980 | United Kingdom | 251/7 |

*Primary Examiner*—John Fox
*Attorney, Agent, or Firm*—Renner, Otto, Boiselle & Sklar P.L.L.

[57] ABSTRACT

A pinch type control valve uses an elastic sleeve having main flanges at each end of a center pinch section with flange gasket extensions on each end. The flanges of the flange gasket extensions project through metal backing flanges and each cooperates with a machined countersunk annular face groove on such metal backing flanges to pull the flange of the gasket extension radially outwardly as it is compressed. Offset annular beads on the opposite faces of the flange of the gasket extension help in achieving the required radial tensioning regardless of the type of flanging of the system. The annular face groove in the metal flange readily accommodates either flat or raised face pipe flanging. The metal backing flange fits between the main flange and the gasket flange and doesn't require the presence of the valve housing. This enables the sleeve to be tested without complete assembly. The sleeve center section is reinforced from the main flanges through a built up center hat section which forms shoulders substantially abutting but not joined to the root portions of the contiguous main flanges. This provides hinge points for the reinforcement avoiding significant stretch and enabling the center section to be considerably axially shortened. Also disclosed is a method of making the sleeve, the valve, and a method of installing the valve in a pipe system, or sleeve alone for testing.

37 Claims, 6 Drawing Sheets

CONTROL VALVE AND METHOD OF MAKING AND INSTALLING

This invention relates generally as indicated to a control valve, and method of making and installing the valve. More particularly, the invention relates to a pinch type valve, a sleeve for such valve, and a method of making the sleeve, as well as a method of installing the valve, or the sleeve alone for testing.

BACKGROUND OF THE INVENTION

Pinch valves typically pinch a rubber or elastic sleeve mounted in a fluid conduit system to control flow, completely or partially blocking flow. The sleeve of such valves usually has flanges at each end of the center pinch section. Examples of such sleeves with end flanges are seen, for example, in U.S. Pat. Nos. 3,268,201, 3,771,758, 3,724,807, 4,172,980, 4,322,054, 4,372,528, 4,492,253 and 4,523,738.

Such flanges serve typically as the gasket sealing each end of the sleeve in a typical flange connection high pressure pipe system. The sleeve flanges are compressed between the standard metal pipe flange on the exterior and an interior metal flange with clamp fasteners passing between the metal flanges and through the sleeve flange. The interior metal flange is usually on the end of the metal valve housing surrounding the sleeve, whether the valve be mechanically or fluid operated.

This mounting system has several major drawbacks. After the sleeve is constructed, in order to test the sleeve, the internal flange must be provided which is usually only provided by building the valve housing around the sleeve and then installing the valve in the flanged connections of the system. If the sleeve is then faulty, this can be a time consuming and expensive proposition. In other words, one usually can't otherwise test the sleeve.

This is particularly true with air operated valves since one usually can't make a seal without installation, or some very expensive jury rig testing machine. Even so, the sleeve flanges still have to be positioned between pipe flanges and compressed.

Accordingly, it would be advantageous to have a sleeve for such valves which could easily be rigged for testing without complete construction and installation of the valve.

Another disadvantage of such construction is when the sleeve flange is sufficiently compressed to make the required seal, the interior of the sleeve will bulge slightly inwardly and create a protrusion into, or restriction in the flow path where none is wanted. Although some protrusions are intentional for certain flow or pressure characteristics as seen in U.S. Pat. No. 4,372,528, unintentional restrictions are not desirable, particularly where the medium controlled is a slurry which would tend to abrade the sleeve.

Also, the sleeve flange is often used as the anchor location for belts or reinforcement extending through the center pinch section. The containment of such belt or reinforcement ends, or even special anchors as seen in prior U.S. Pat. No. 4,523,738, compromises the function of the flange as a sealing gasket, and vice versa.

The sleeve flange, in part because of its containment of belts, reinforcements or anchors isn't usually suitable for connection with more than one type of pipe flanging. For example, the most common pipe flangings used are flat faced and raised face. A raised face flange connection includes a slightly raised ring on one flange face which telescopes into a socket on the mating flange face. Using a conventional pinch sleeve flange for both types of connection may result in a poor connection and/or damage to the sleeve contributing to early failure and shortening the useful life of the sleeve. Although it is possible to use additional gasketing or to design the sleeve flange for a specific type of system pipe flanging, this creates multiple economic problems.

Accordingly, it would be desirable to have a pinch valve which can readily be incorporated in a system without regard to the type of system pipe flanging, without additional gaskets, without compromising the pinch section reinforcement, and without creating bulges, protrusions or distortions in the flow path, particularly at the valve ports.

The use of such belts and reinforcements which extend into the sleeve flanges creates a number of design problems for such pinch or control valves. The fabric used for such belts or reinforcements must normally stretch 15 to 20% to achieve complete and proper closure of the valve. This stretching or tension creates wear points at the root of the flanges since the fabric wants to pull inwardly or toward the center as it goes around the corner at the root of the flange. To avoid this problem, pinch sleeve sections are normally longer than they would otherwise be since the longer the pinch section, the less stretch is required to achieve proper closure. While this may somewhat obviate the corner wear problem, it creates a pinch control valve which is longer than the ANSI (American National Standards Institute) standards for a comparable gate valve. This is particularly true for larger size valves. This then means that special fabrication and sections are required to incorporate a pinch control valve into a system. Such systems are considerably less expensive to design and erect if standard parts and lengths can be used. The lack of adherence to ANSI standards can mean the selection of a less efficient or effective valve solely for cost considerations.

It would accordingly be desirable to have a reinforced pinch valve sleeve where the stretch or tension problem is avoided not only avoiding the wear problems encountered, but also enabling the center pinch section to be shorter than normal so that the overall size of the sleeve and valve matches the ANSI standards for comparable gate valves.

SUMMARY OF THE INVENTION

A pinch type control valve employs an elastic sleeve having main flanges at each end of a center pinch section with flange gasket extensions on each end extending axially beyond the main flanges. The flanges of the flange gasket extensions project through a metal backing flange and cooperate with a machined countersunk annular face groove on the metal backing flange to pull the flange of the gasket extension radially outwardly as it is compressed. Offset annular beads on the opposite faces of the flange of the gasket extension help in achieving the required radial movement regardless of the type of flanging of the system. The annular face groove in the metal backing flange readily accommodates either flat or raised face pipe flanging. The metal backing flange fits between the main flange and the gasket flange and doesn't require the presence of the valve housing. This enables the sleeve to be tested without complete assembly.

The sleeve center section is reinforced by a belt extending from the main flanges through a built up center hat section which forms shoulders substantially abutting but not joined to the contiguous or adjacent root of the main flanges.

The reinforcing which includes the belt extends radially in the main flanges, then axially, and then radially outwardly at the shoulder of the hat section, and then axially across the radially enlarged hat section. The path of the reinforcement and the configuration of the shoulder form hinge points which avoid significant stretch of the fabric of the reinforcement when the center section is pinched. The axial length of the center section is considerably shortened enabling the overall length of the sleeve to be reduced so that the valve will fit an ANSI standard for a comparable gate valve.

The method of making the sleeve comprises the steps of forming the flange gasket extensions in addition to partially forming the main flanges, forming the center built up hat section and the reinforcement from the main flanges to and around the shoulders of the hat section. Care is taken that the side walls of the shoulders do not bond to the inside root of the main flanges during cure or vulcanization.

The method of installing the valve includes the step of inserting the flange gasket extension of the sleeve through the metal backing flange and then axially compressing the flange of the gasket extension in the especially configured groove in the face of the metal backing flange with the integral beads assisting the compressing, sealing, and movement of the flange, whether the pipe flange system be flat faced or raised face. The compression radially stretches the gasket of the gasket extension avoiding surface irregularities in the internal fluid passage at the joint or port.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
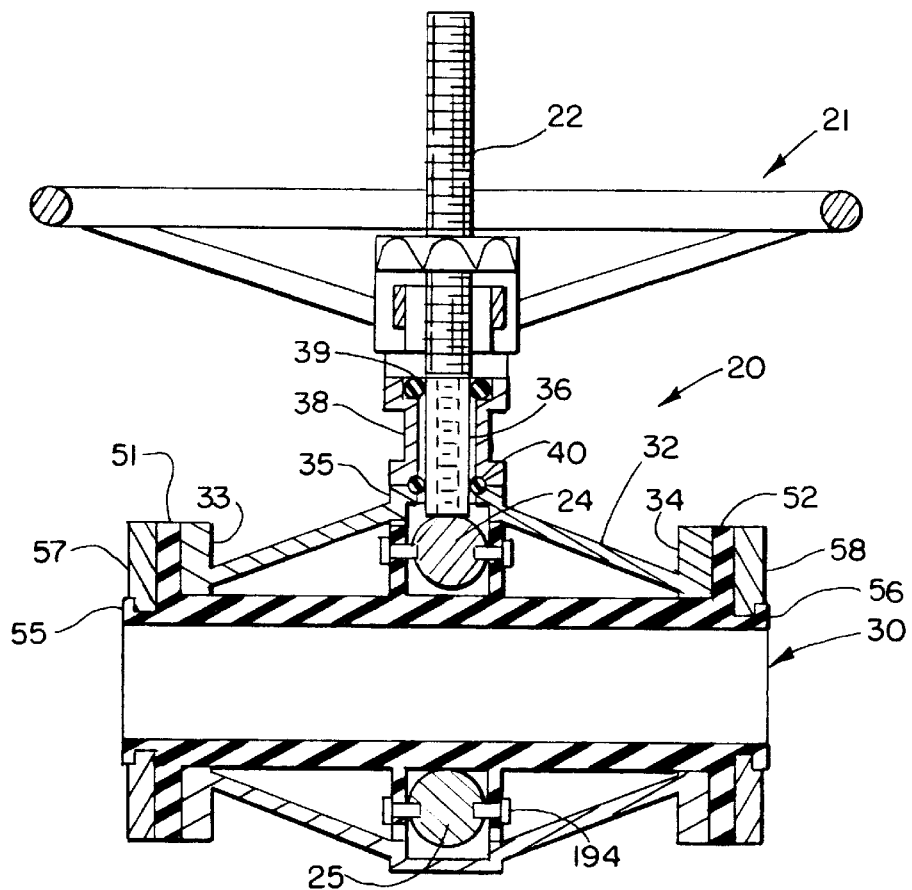
FIG. 1 is a vertical section of one form of mechanically operated valve in accordance with the present invention.

Referring initially to FIG. 1, there is illustrated a valve 20 in accordance with the present invention. The illustrated valve is mechanically operated by hand wheel indicated at 21. The hand wheel 21 rotates hollow screw 22 which has opposite hand threads on the inside and outside. As the screw rotates, the internal threaded connection forces downwardly upper pinch bar 24 and the external threaded connection pulls upwardly lower pinch bar 25 so that the elastomeric sleeve shown generally at 30 is pinched evenly. The valve includes a housing 32 provided with flanges 33 and 34 and a central boss 35 through which extends the lower unthreaded exterior of the screw 22 as seen at 36. The screw shank extends through support sleeve 38 and is sealed as indicated at 39 and 40. The hanger rods for the lower pinch bar are similarly sealed. In any event, as the hand wheel rotates the screw 22 the internal threads force the upper pinch bar down while the external threads pull the lower pinch bar up. The sleeve is thus uniformly pinched at the center and is attached to the pinch bars as indicated in FIG. 1 for positive restoration as hereinafter more clearly described.

The illustration of FIG. 1 is simply to show a mechanically operated pinch control valve and it will be appreciated that a wide variety of mechanical control mechanisms may be employed for the opening or closing of the valve, and reference may be had to U.S. Pat. Nos. 4,172,580 and 4,322,054 for examples of such mechanical mechanisms.

Figure 2:
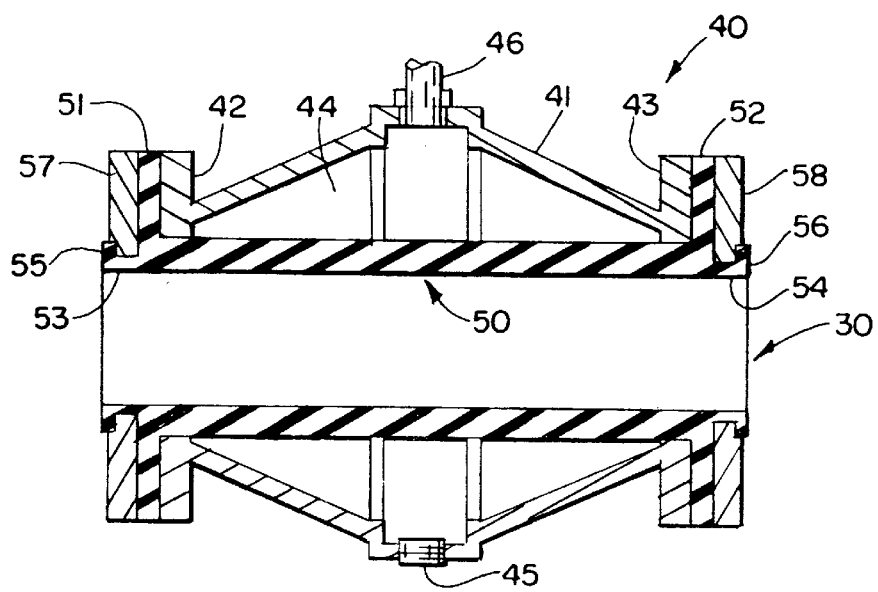
FIG. 2 is a similar vertical section of a valve in accordance with the present invention operated by fluid pressure.

As seen in FIG. 2, there is illustrated a valve 40 in accordance with the present invention. The valve 40 uses the same sleeve 30 and a similar valve housing 41 having valve housing flanges 42 and 43. The valve housing forms an annular chamber 44 surrounding the center section of the sleeve 30. The housing may include a number of ports. The port at the bottom may be plugged as seen at 45 while the port at the top is provided with a pressure conduit 46. In this manner, the chamber 44 may be pressurized, vented, or supplied with a partial vacuum to control the pinching and restoration of the sleeve. Typically pneumatic pressure at about 80 psi will be employed to pinch the sleeve.

With reference to both FIGS. 1 and 2, it will be seen that the sleeve 30 in each case is essentially the same and both sleeves include a center pinch section 50, main flanges 51 and 52, and, extending therebeyond, flange gasket extensions 53 and 54, respectively, each extension including a gasket flange as seen at 55 and 56. The metal flanges of the valve housings fit inside the main flanges 51 and 52 of the sleeve while metal backing flanges are provided between the main flanges and respective gasket flanges as seen at 57 and 58. What is not illustrated in FIGS. 1 and 2 is the pipe flange connection at each end of the valve which forms a conduit having the same internal diameter as the sleeve.

Figure 3:
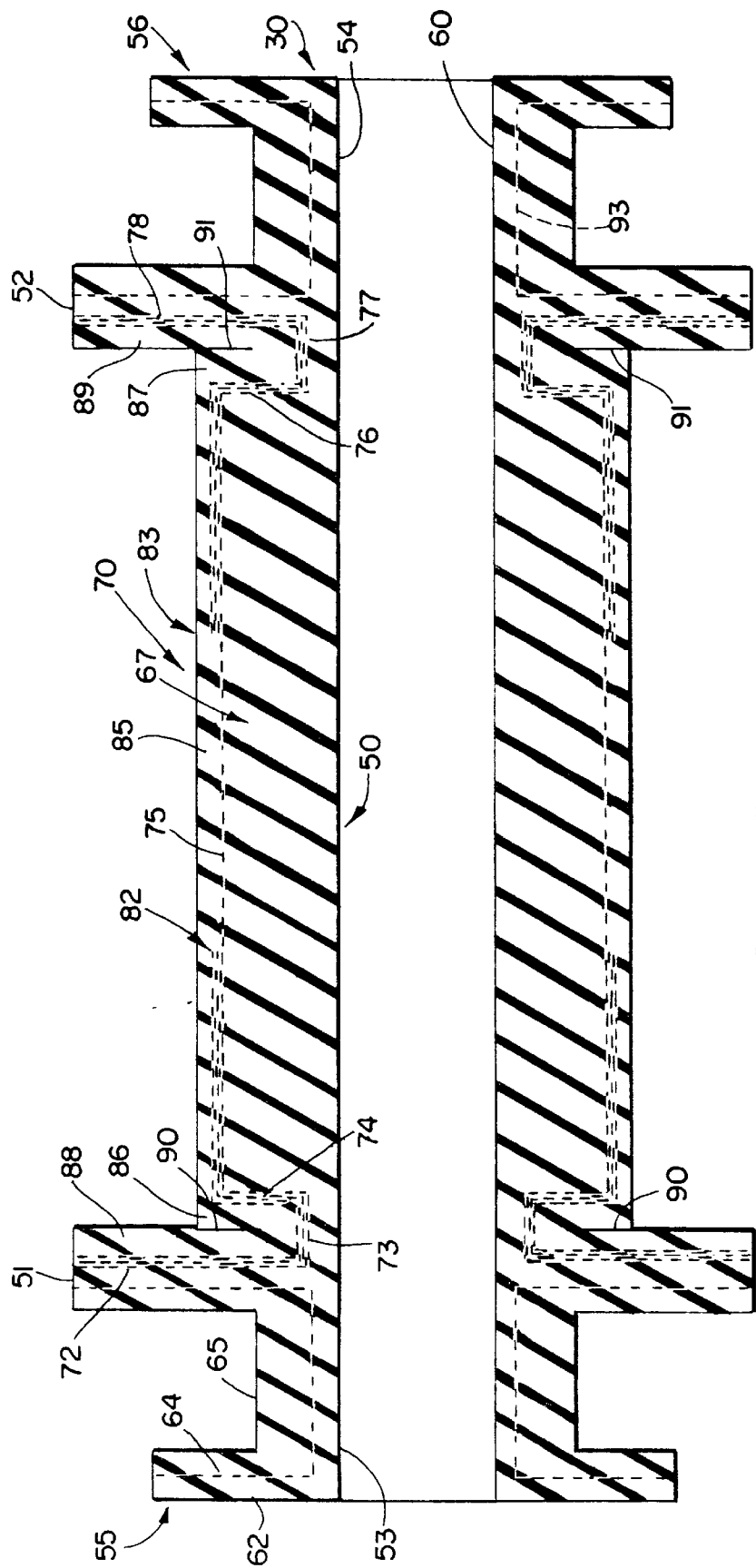
FIG. 3 is an enlarged axial section of a sleeve in accordance with the present invention.

Referring now to FIG. 3, there is illustrated a sleeve 30 in accordance with the present invention. The sleeve is formed of an elastic material which may vary depending upon the application of the valve. For example, the sleeve may be made of pure gum rubber, or synthetic rubbers such as Neoprene. Other elastomers which may be employed are urethanes, butadiene acrylo-nitriles (Buna-N), chlorobutyl elastomers, EPDM, silicon rubbers, Buna-S, chlorosulfonated polyethylene such as HYPALON, fluoroelastomers such as VITON or FLOUREL, or tetrafluoroethylene resins such as TEFLON. HYPALON, VITON and TEFLON are registered trademarks of E.I. DuPont de Nemours & Co. Inc. while FLOUREL is a registered trademark of 3M Companies.

The sleeve seen in FIG. 3, is built on a rotatable mandrel and the first item formed on the mandrel is the internal liner 60. The liner material is selected for the particular use of the valve and may include food grades of some of the above materials. As the sleeve is built up by wrapping and overlapping the components on the rotatable mandrel, the various flanges and gaskets are constructed from left to right. For example, after the liner is formed, the outer face of the gasket 55 is formed as indicated at 62. The flange 51 is also partially constructed and fabric reinforcement in one or more layers indicated at 64 may be included. The flange gasket extension is then built up to the desired outside diameter indicated at 65 before the interior of the gasket 55 is completed as well as the exterior of the flange 51. The elastomer layers as well as the reinforcing belts or fabric are formed in conventional manner by starring or fingering with the fingers being bent to extend radially forming the internal corners of the reinforcement. As indicated, a number of layers of such reinforcement may be provided with the fingers of adjacent layers circumferentially offset.

Next, the center pinch section 50 is built up in the center as indicated at 67 to begin to form what may be termed a center hat section 70. Before the hat section is completed, the other main flange 52 will be partially constructed. Center reinforcement in the sleeve is provided in the form of one or more belts with one edge being starred or fingered, overlapped and stitched to extend radially in the flange 51 as indicated at 72. The belt then extends axially from the flange to the center section as seen at 73, and then radially outwardly at the edge of the center section as seen at 74, then completely across the center section as seen at 75, radially inwardly at the opposite edge of the center section as indicated at 76, axially from the center section to the flange 52 as indicated at 77, and then radially outwardly within the flange 52 as seen at 78. At least one belt or reinforcement extends from flange to flange as indicated and additional belts or reinforcements may be provided around the corners as indicated from the flanges 51 and 52 to the points indicated at 82 and 83 in the center section. The illustrated embodiment illustrates at least two additional reinforcement layers around the hinge or corner portions of the reinforcement path. After such reinforcement is in place, the center section is built up as indicated at 85 as are the shoulders of the center section indicated at 86 and 87. Also the inner faces of the flanges 51 and 52 are formed as seen at 88 and 89, respectively, preferably with a somewhat harder rubber type material.

When the inner face of the flanges is formed, which is contiguous to the adjoining center section shoulder, the adjoining portions at the root of the flange indicated at 90 and 91 are treated or provided with a removable barrier so that upon curing or vulcanization of the sleeve, bonding does not occur between the shoulder of the center section and the root of the adjoining flange. There is accordingly formed an annular slit of uniform depth at each end of the center pinch section.

The opposite end of the sleeve is completed in the same manner including reinforcement 93 in the flange 52, the flange gasket extension 54 and the gasket of such extension 56. The flanges may be trimmed and a final coating or layer put on the outer surfaces of both the flange gasket extensions, the center section, as well as the gaskets and flanges. The sleeve may then be shrink wrapped and vulcanized.

Figure 4:
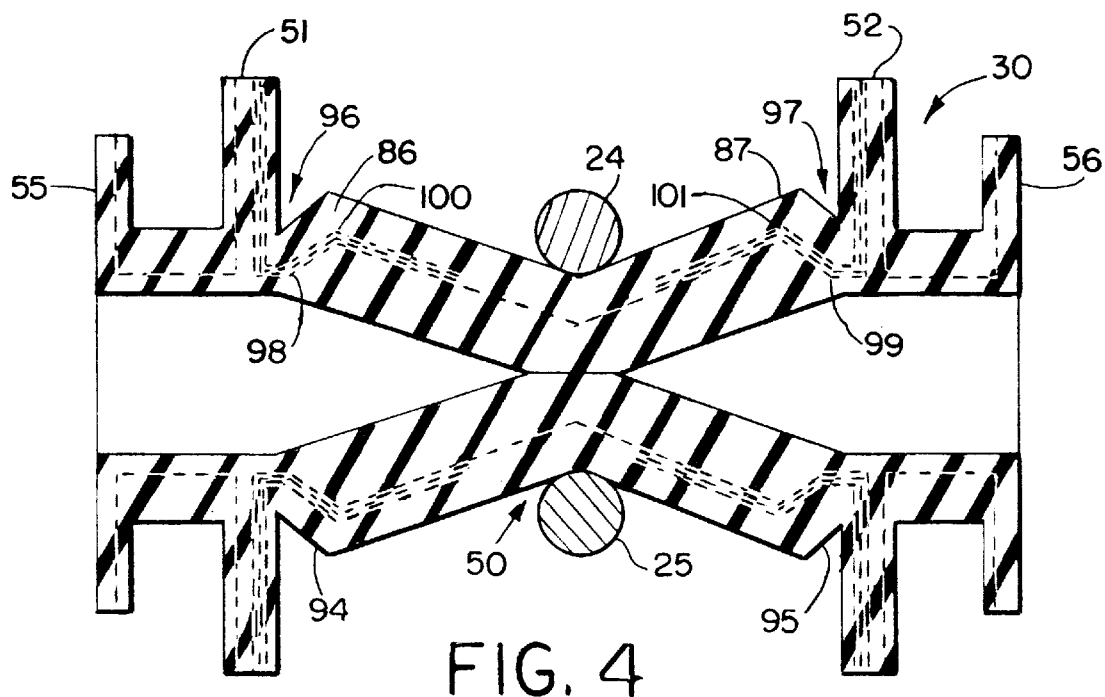
FIG. 4 is a view like FIG. 3 but showing the sleeve mechanically pinched.

Referring now to FIG. 4, there is illustrated a sleeve in accordance with the present invention mechanically pinched. The pinch bars 24 and 25 have moved toward each other at the center of the pinch section closing the passage through the sleeve. FIG. 4 illustrates that the wall of the shoulder 86 seen at 94 and the wall of the shoulder 87 seen at 95 have hinged away from the root portion of the adjoining flanges 51 and 52, respectively. An acute internal angle is formed as indicated at 96 and 97, respectively. The reinforcement correspondingly hinges outwardly as indicated at 98 and 99 while the corner of the reinforcement at the outer end of the shoulder has gone from approximately a right angle to an angle larger than a right angle, as seen at 100 and 101.

It can now be seen that the path and construction of the internal reinforcement is such that tension on the reinforcement is substantially avoided with the corners acting as hinge points forming a pleat which tends to straighten out as the sleeve is pinched.

Figure 5:
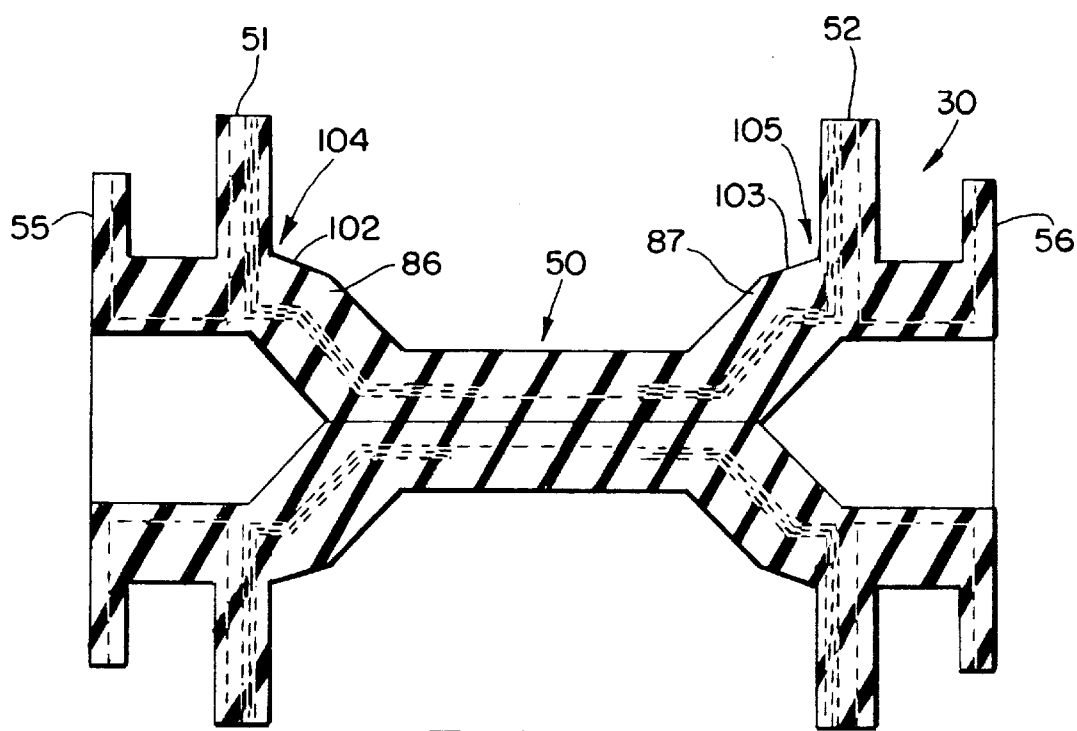
FIG. 5 is a similar view showing a sleeve of a fluid operated valve closed at normal pressure.

FIG. 5 illustrates the sleeve 30 in, for example, an air operated valve closed at normal line pressure such as 80 psi. In the closed position illustrated, the shoulder walls 94 and 95 of the center hat section have moved to the positions shown at 102 and 103 and have formed larger than right angles with the root section of the adjoining flange as seen at 104 and 105, respectively. The path of the belt or reinforcement from flange to flange is still not longer than in the open position of FIG. 3 and accordingly significant tension or stretching of the reinforcement is avoided.

Figure 6:
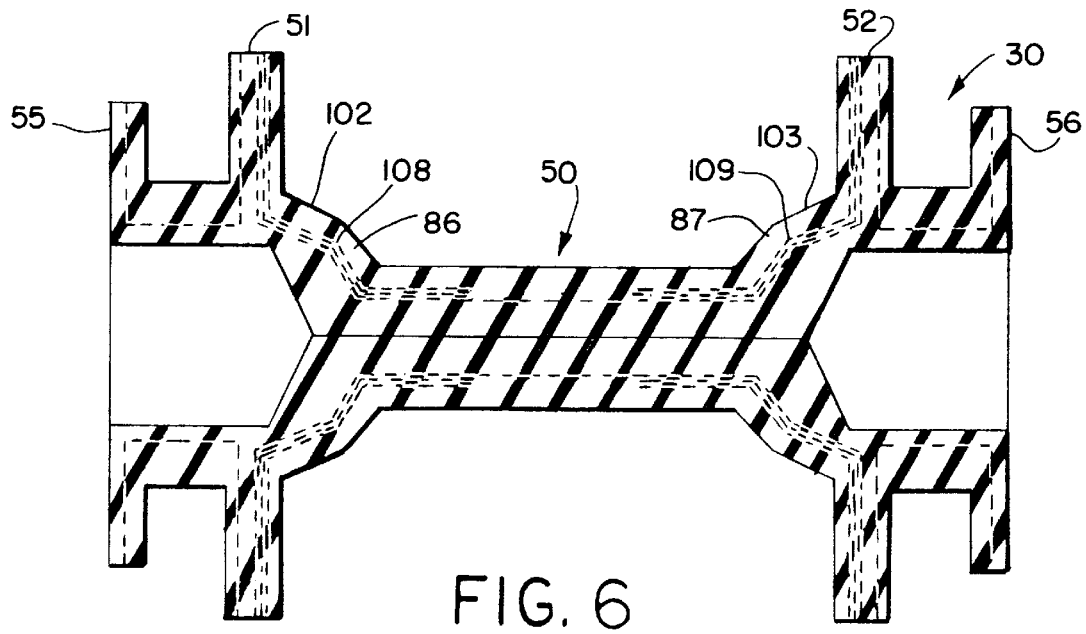
FIG. 6 is a similar view showing the sleeve closed at a higher excess pressure.

Referring now to FIG. 6, there is illustrated a sleeve in, for example, an air operated valve where the sleeve is subjected to an over pressure. It may be a situation where someone has forgotten to include or operate a pressure reducer. It will be seen that the center pinch section 50 of the sleeve is simply closed along a greater axial length blocking the internal passage. The shoulder corner or hinge still forms an obtuse angle as seen at 108 and 109 and the reinforcement still has not completely straightened. In this manner, the fabric or material of the reinforcement is still not under tension even under such extreme operating conditions. The construction of the belt with the outwardly deviating path over the top of the enlarged center pinch or hat section together with the hinge points enables the sleeve to be closed without creating any substantial pull or tension on the reinforcement particularly at the root or inside corner of the sleeve flanges. This construction then enables the center pinch section to be foreshortened enabling the sleeve face-to-face dimension to be the same as a comparable face-to-face dimension of an ANSI standard gate valve. This can be achieved in spite of the provision of the flange gasket extensions on each end.

Figure 7:
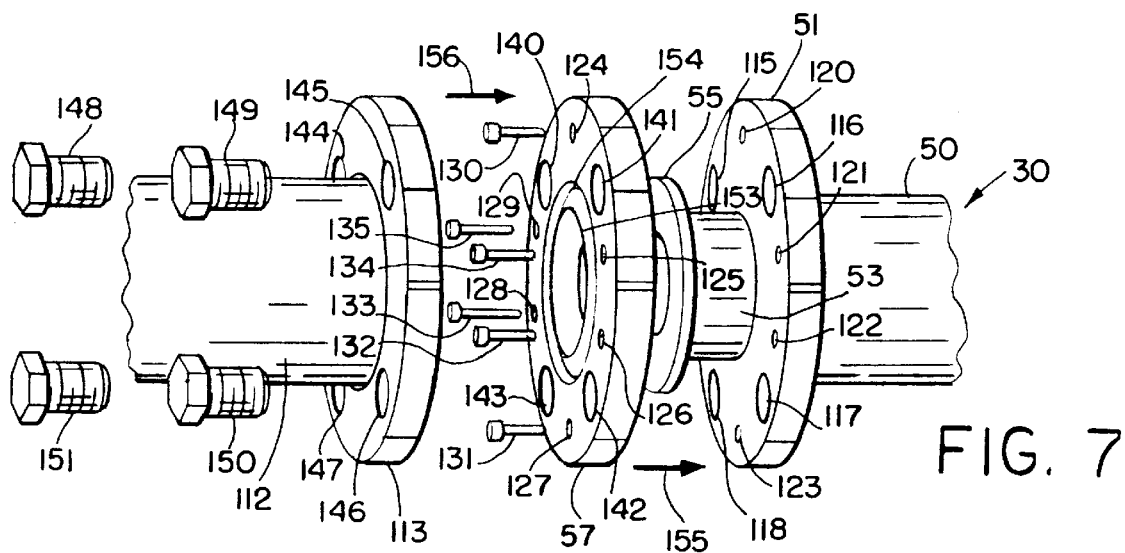
FIG. 7 is an exploded view showing the metal backing flange being inserted on one end of valve sleeve and the flanged pipe to which it will be coupled.

As indicated, the flange gasket extensions enable the sleeve readily to be attached to a pipe flange, regardless of type, and with or without the valve housing in place. FIG. 7 illustrates the sleeve 30 on the right without the valve housing in place. On the left is illustrated a pipe 112 having flange 113. In the center is illustrated the metal backing flange 57. The flange 51 of the sleeve is provided with quadrant spaced larger holes 115, 116, 117 and 118, and a series of equally spaced smaller holes seen at 120, 121, 122 and 123. All of the holes in the main flange 51 are throughholes. Corresponding holes 124, 125, 126 and 127 are provided in the backing flange 57 as well as holes 128 and 129 for the holes not appearing in the flange 51. These holes in the backing flange are countersunk to receive the six fasteners indicated at 130 through 135.

The backing flange 57 is also provided with four quadrant spaced holes 140, 141, 142 and 143 which are aligned with through-holes 144, 145, 146 and 147 in the flange 113 of the pipe 112. The holes 140 through 143 are threaded to receive the relatively large cap screws indicated at 148 through 151.

In assembly, the flange gasket extension 53 including the gasket 55 are folded and inserted through hole 153 in the flange 57. This then places the gasket 55 on the left hand side of the backing flange 57 seen in FIG. 7 with specially machined groove 154 behind the flange. At this point the fasteners 130 through 136 may be inserted through the holes in the backing flange and also the corresponding holes in the sleeve flange 51. If the flange 33 of the valve housing is present, the fasteners will threaded into tapped holes in such flange. If the valve housing is not present, such fasteners may simply be secured by nuts or not secured at all. The pipe 112 is then secured to the backing flange by the fasteners 148 through 151 extending through the holes in the flange and being threaded into the backing flange 57 to clamp the gasket 55 in the manner hereinafter described. Accordingly, the sleeve may be connected at each end to a pipe flange whether the housing for the valve is present or not, and the sleeve may be tested prior to installation and use. With the aid of the backing flange 57 and moving the parts in the direction of the arrows seen at 155 and 156 in FIG. 7, a connection and proper seal can be made at each end of the sleeve.

Figure 8:
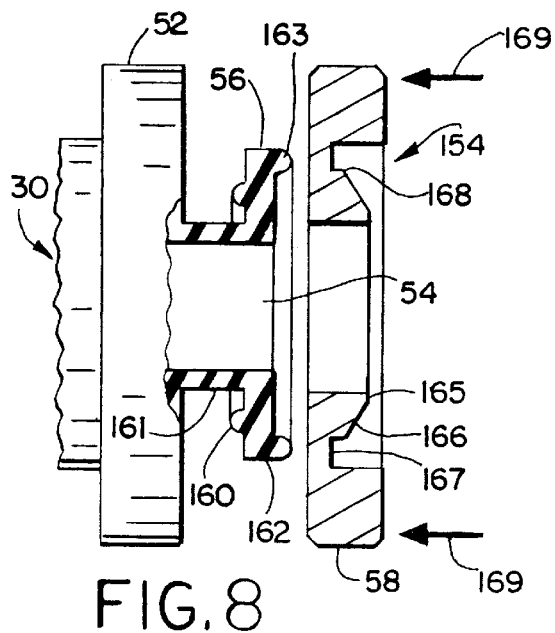
FIG. 8 is a schematic view of the metal backing flange being inserted on the gasket, and also showing the integral beads, as well as, somewhat exaggerated, the configuration of the groove in the backing flange.
Figure 9:
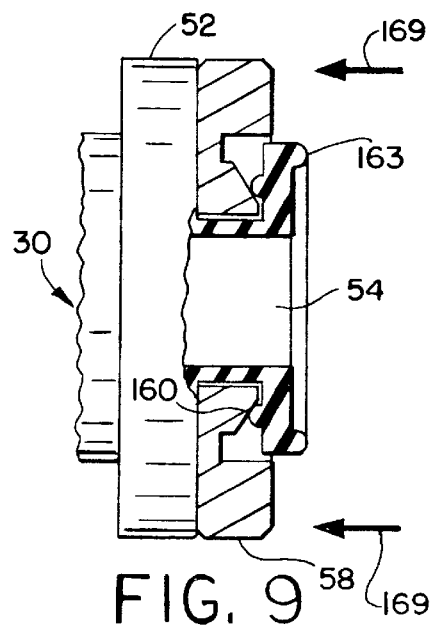
FIG. 9 is a similar view with the metal backing flange in place.

Referring now to FIGS. 8 and 9, there is illustrated the details of the gasket 56 of the flange gasket extension 54, as well as the details of the annular face groove 154 in the metal backing flange 58. It will be noted that the gasket 56 is provided with an integrally formed annular bead or ring 160 on its interior or inside radial surface. The bead is approximately half way between the cylindrical outer wall 161 of the extension 54 and the outer edge 162. The opposite face of the gasket is provided with an annular integral bead or ring as seen at 163 at its annular edge.

The machined and countersunk face groove 154 in the outer face of the metal backing flange includes a recessed radial annular portion 165, a conical section 166, and a more deeply recessed radial groove 167 recessed beyond the outer corner 168 of the conical surface 166. The dimensions and configuration of the face groove are somewhat exaggerated for clarity of illustration. For example, the cone angle of the section 166 is preferably about 12 degrees. Also, the thickness of the gasket of the flange gasket extension is sufficiently larger than the depth of the face groove to provide sufficient compression and resilience for a tight seal to be achieved before metal-to-metal seating, regardless of the type of flange of the piping system.

In FIG. 9, the backing flange 54 has been installed on the end of the sleeve and it will be noted that the annular bead or ring 160 contacts the conical surface. In any event, the backing flange 58 can readily be inserted on the end of the sleeve by movement in the direction of the arrows 169 seen in FIGS. 8 and 9.

Figure 10:
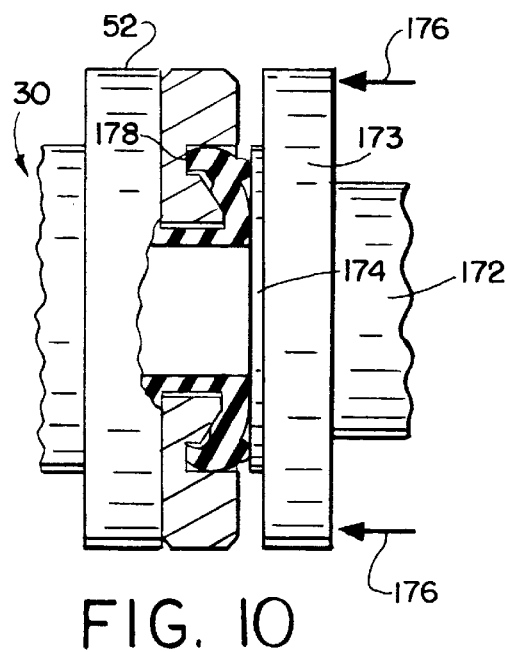
FIGS. 10 and 11 are similar views showing the joining of a raised face flange to the valve sleeve.
Figure 11:
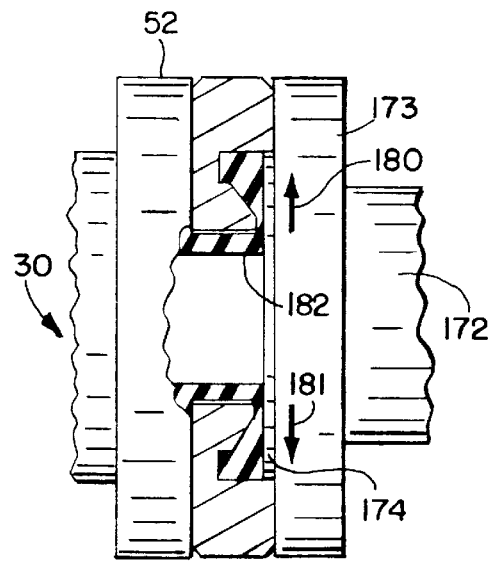

Referring now to FIGS. 10 and 11, there is illustrated a pipe 172 having a flange 173 with a raised face indicated generally at 174. The annular raised face is designed to telescope within a recess in a mating pipe flange and the raised face 174 has a diameter snugly to telescope within the face groove 154 in the backing flange 58.

As the pipe flange moves in the direction of the arrows 176 seen in FIG. 10, such raised face initially contacts the ring or bead 163 and tends to deflect the outer periphery of the gasket 56 toward the bottom of the groove 167 as indicated at 178. Because of the radial offset between the two rings, the inner ring 160 acts as a fulcrum so that deflection of the periphery of the gasket around the bead ring 160 pulls the radial inner annular portion of the gasket radially outwardly. Accordingly, as the pipe flange moves to its seated position as seen in FIG. 11 the configuration of the face groove and the position of the integral beads creates a radial tension on the flange as seen by the arrows 180 and 181. This then avoids any surface irregularities or bulges at the point 182 which would be caused by ordinary compression of a flange. Many pinch valves are used in a service with slurries, many of which are abrasive. Accordingly, a smooth transition at the port of the valve between the pipe and the valve is important to avoid increasing turbulence and abrasion damage to the sleeve.

Figure 12:
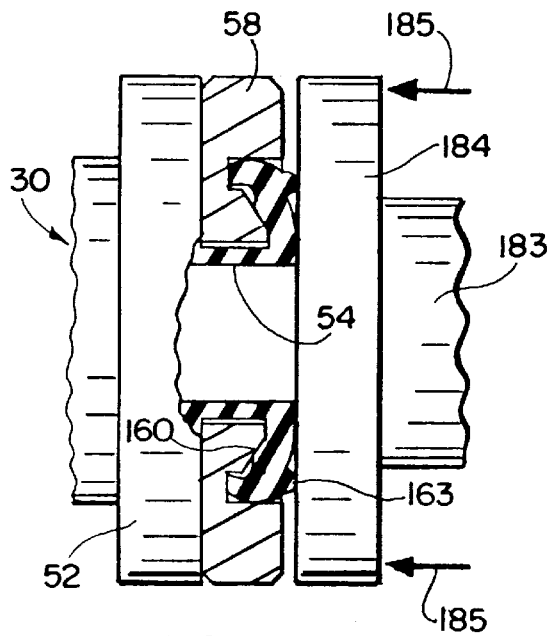
FIGS. 12 and 13 are similar views showing the joining of a flat face flange to valve sleeve.
Figure 13:
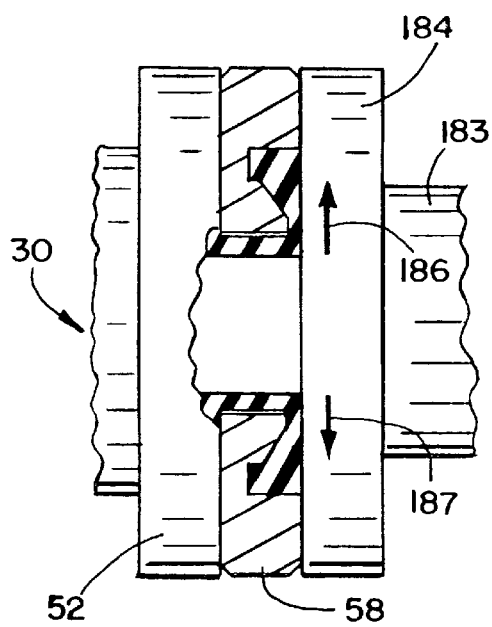

FIGS. 12 and 13 are identical to FIGS. 10 and 11 except that the pipe 183 has a flat face flange 184. No raised face is provided. However, when the pipe is clamped against the gasket in the direction of the arrows 185, the same radial tensioning will take place as indicated by the arrows 186 and 187 seen in FIG. 13. Again because of the volume of gasket material as opposed to the volume of the face groove, sufficient compression resilience is available to form a tight seal before any metal-to-metal seating of the flange 184 and the backing flange 58.

Figure 14:
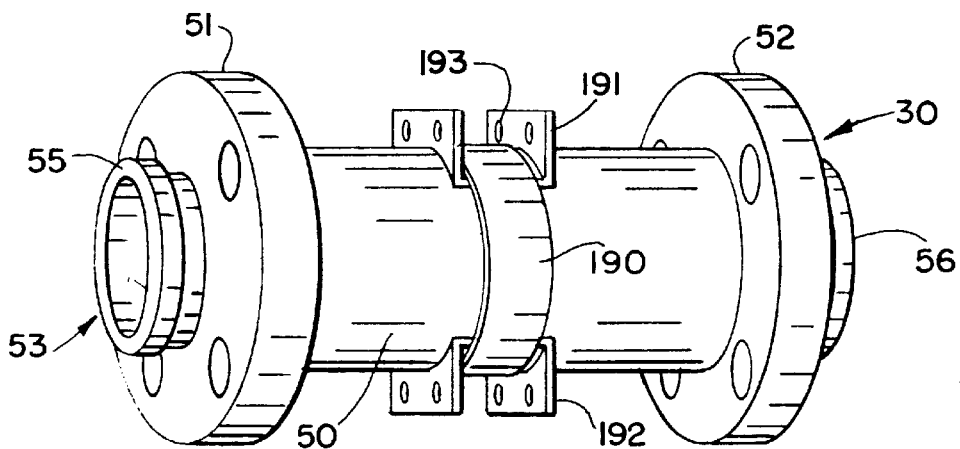
FIG. 14 is a perspective view of the valve sleeve with a belt by which the mechanical pinching bars of the FIG. 1 embodiment may be connected to the sleeve to ensure positive sleeve opening.

FIG. 14 illustrates an elastic belt 190 which may gird the middle of the sleeve. The elastic girdle 190 holds flexible U shaped tabs 191 and 192, the ears of which are provided with holes 193. Suitable fasteners such as indicated in FIG. 1 at 194 may be employed to hold the tabs to the pinch bars. This then ensures that the sleeve will open regardless of the age of the sleeve or pressure conditions.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What we claim is:

1. A flow control pinch valve sleeve formed of reinforced elastic material comprising annular main flanges and a cylindrical center pinch section therebetween, at least one annular reinforcing belt means having a radial position extending from one main flange to the other through the cylindrical center pinch section and the radial position of the annular reinforcing belt means within the center pinch section deviating radially outwardly at the center of the center pinch section whereby when the center pinch section is pinched, the annular reinforcing belt means is deflected inwardly without creating significant tension on the annular reinforcing belt means.

2. A sleeve as set forth in claim 1 wherein said center pinch section includes shoulders adjacent the flanges, said annular reinforcing belt means generally following the shape of said shoulders.

3. A sleeve as set forth in claim 2 wherein said shoulders are substantially right angle shoulders each having a radial wall substantially adjacent to but separate from the adjacent main flanges.

4. A flow control pinch valve sleeve formed of reinforced elastic material comprising annular main flanges and a cylindrical center pinch section therebetween, at least one annular reinforcing belt extending from one main flange to the other through the cylindrical center section, the radial position of the belt within the center section deviating radially outwardly at the center of the section whereby when the center section is pinched, the belt is deflected inwardly without creating significant tension on the belt, said center section including shoulders adjacent the flanges, said belt generally following the shape of said shoulders, said shoulders being substantially right angle shoulders each having a radial wall substantially adjacent to but separate from the adjacent main flanges, and said belt at each edge extending radially within the main flanges, axially into the center section, radially outwardly at said shoulders, and axially across said center section.

5. A sleeve as set forth in claim 4 wherein said belt is reinforced where it shifts from a radial to axial direction and vice versa.

6. A sleeve as set forth in claim 5 including flange gasket extensions extending axially beyond said main flanges, each extension including a gasket flange, each said extension being adapted to receive a metal backing flange between the respective main flange and gasket flange, whereby a pipe flange may be secured to said backing flange compressing said gasket flange to form a seal at each end of the sleeve.

7. A sleeve as set forth in claim 6 including means on said gasket flange radially to tension said gasket flange as it compressed.

8. A sleeve as set forth in claim 7 wherein said last mentioned means comprises radially offset annular beads on the opposite axial faces of said gasket flange.

9. A sleeve as set forth in claim 6 including in combination said metal backing flanges, a face groove in each said backing flange, the configuration of said face groove cooperating with said gasket flange to tension said gasket flange as it is compressed into said groove.

10. A sleeve as set forth in claim 9 wherein said face groove includes a conical section, the apex of the cone pointing axially away from the center section.

11. A sleeve as set forth in claim 10 including radially offset beads on said gasket flange, the inner most bead contacting said conical surface when said gasket flange is compressed to act as a fulcrum to pull the interior of the gasket flange radially outwardly.

12. A flow control pinch valve sleeve having two ends comprising annular main flanges and a cylindrical center pinch section therebetween adapted to be pinched to block or control flow therethrough, flange gasket extensions extending axially beyond said main flanges, each flange gasket extension including a gasket flange having opposite axial faces, each said flange gasket being adapted to receive a metal backing flange between the respective main flange and gasket flange whereby a pipe flange may be secured to such metal backing flange compressing said gasket flange to form a seal at each end of said sleeve.

13. A sleeve as set forth in claim 12 including means on each said gasket flange radially to tension each said gasket flange as it compressed.

14. A sleeve as set forth in claim 13 wherein said last mentioned means comprises radially offset annular beads on the opposite axial faces of said gasket flange.

15. A sleeve as set forth in claim 12 including in combination said metal backing flanges, a face groove in each said backing flange, the configuration of said face groove cooperating with said gasket flange to tension said gasket flange as it is compressed into said groove.

16. A sleeve as set forth in claim 15 wherein said face groove includes a conical section, the apex of the cone pointing axially away from the center section.

17. A sleeve as set forth in claim 16 including radially offset beads on said gasket flange, the inner most bead contacting said conical surface when said gasket flange is compressed to act as a fulcrum to pull the interior of the gasket flange radially outwardly.

18. A sleeve as set froth in claim 12 including at least one annular reinforcing belt extending from one main flange to the other through the cylindrical center pinch section and having a radial position, the radial position of the belt within the center section deviating radially outwardly at the center of the center section whereby when the center section is pinched, the belt is deflected inwardly without creating significant tension on the belt.

19. A sleeve as set forth in claim 18 wherein said center pinch section includes shoulders having a shape adjacent the main flanges, said belt generally following the shape of said shoulders.

20. A sleeve as set forth in claim 19 wherein said shoulders are substantially right angle shoulders each having a radial wall substantially adjacent to but separate from the adjacent main flanges.

21. A sleeve as set forth in claim 20 wherein said belt has edges, and at each edge extends radially within the main flanges, axially into the center pinch section, radially outwardly at said shoulders, and then axially across said center pinch section.

22. A sleeve as set forth in claim 21 wherein said belt is reinforced where it shifts from a radial to axial direction and vice versa.

23. A sleeve for a pinch valve comprising a center pinch section, and a flange at each end of the center pinch section, said center pinch section including a radially enlarged section having shoulders not attached to said flanges so that as the center section is pinched, said shoulders will hinge away from said flanges.

24. A sleeve as set forth in claim 23 including annular reinforcement extending from within said flanges and around said shoulders.

25. A sleeve as set forth in claim 24 wherein said annular reinforcement includes a belt extending from one flange to the other.

26. A sleeve as set forth in claim 25 wherein said belt extends radially outwardly at the shoulders, whereby pinching said center pinch section substantially avoids axial tension on said belt.

27. A sleeve as set forth in claim 26 including a gasket extension projecting beyond each flange for mounting the sleeve in a fluid system.

28. A pinch valve sleeve comprising a cylindrical pinch section having axial ends, and an exterior, and annular flanges at each axial end of the cylindrical pinch section, the exterior of the cylindrical pinch section being built up to extend radially outwardly to form shoulders at each axial end of the pinch section, each said shoulder hinging away from the flange when the sleeve is pinched.

29. A pinch valve sleeve as set forth in claim 28 wherein each shoulder is adjacent the respective flange.

30. A pinch valve sleeve as set forth in claim 29 wherein each shoulder includes a radially extending side wall.

31. A pinch valve sleeve as set forth in claim 30 wherein at least an acute angle is formed between each shoulder side wall and the respective flange when the sleeve is pinched.

32. A pinch valve sleeve as set forth in claim 31 wherein each shoulder is a substantially right angle shoulder which enlarges to an obtuse angle shoulder when the sleeve is pinched.

33. A pinch valve sleeve as set forth in claim 32 wherein an obtuse angle is formed between said flange and should said wall when said sleeve is pinched by external air pressure.

34. A pinch valve sleeve as set forth in claim 33 including reinforcement within the sleeve extending from within each flange and around each shoulder, such reinforcement hinging as the sleeve is pinched.

35. A pinch valve sleeve as set forth in claim 34 including an annular belt reinforcement extending from within one flange, around the adjoining shoulder, across the pinch section, around the other shoulder and terminating in the other flange, the pinching of said sleeve substantially avoiding tensioning of the belt.

36. A pinch valve sleeve as set forth in claim 34 including additional reinforcement in the sleeve extending from each flange and around the shoulder.

37. A pinch valve sleeve as set forth in claim 36 including a flange gasket positioned axially outwardly of each flange for mounting the sleeve and valve in a fluid system.

* * * * *